US012752667B2

(12) United States Patent
Son

(10) Patent No.: US 12,752,667 B2
(45) Date of Patent: Oct. 6, 2026

(54) FUEL CELL VEHICLE WITH DIFFERENTIAL PRESSURE FLOW METER FOR HUMIDITY MEASUREMENT

(71) Applicant: Ford Global Technologies, LLC, Dearborn, MI (US)

(72) Inventor: Seha Son, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 741 days.

(21) Appl. No.: 18/097,760

(22) Filed: Jan. 17, 2023

(65) Prior Publication Data

US 2024/0239242 A1 Jul. 18, 2024

(51) Int. Cl.

*H01M 8/06* (2016.01)
*B60L 58/30* (2019.01)
*H01M 8/04111* (2016.01)
*H01M 8/0438* (2016.01)
*H01M 8/04828* (2016.01)

(52) U.S. Cl.

CPC ......... *B60L 58/30* (2019.02); *H01M 8/04111* (2013.01); *H01M 8/04395* (2013.01); *H01M 8/04835* (2013.01); *H01M 2250/20* (2013.01)

(58) Field of Classification Search

CPC ......... H01M 8/04111; H01M 8/04395; H01M 8/04835; H01M 8/04753; H01M 8/04089; H01M 8/04223; H01M 8/04029; H01M 8/04425; H01M 8/04432; H01M 2250/20; B60L 58/30

See application file for complete search history.

(56) References Cited

U.S. PATENT DOCUMENTS 6,777,120 B2 8/2004 Nelson et al.
7,687,164 B2 3/2010 Frost et al.
(Continued)

FOREIGN PATENT DOCUMENTS

CN 113921871 A1 1/2022
CN 217655915 U * 10/2022
(Continued)

OTHER PUBLICATIONS

English language translation of CN-217655915) Zhu et al., "Air Humidity Control System of Fuel Cell", Oct. 25, 2022.*
(Continued)

*Primary Examiner* — Raymond Alejandro
(74) *Attorney, Agent, or Firm* — David B. Kelley; Brooks Kushman P.C.

(57) ABSTRACT

A fuel cell system includes an air compressor having an inlet fluidly coupled to ambient, a humidifier fluidly coupled to an outlet of the air compressor, a mass airflow sensor disposed downstream of the air compressor and upstream of the humidifier, a fuel cell stack having a cathode inlet fluidly coupled to an outlet of the humidifier, a differential pressure flow sensor disposed downstream of the humidifier and upstream of the cathode inlet of the fuel cell stack, and a controller programmed to control at least one of the air compressor and the fuel cell stack in response to humidity of airflow to the cathode inlet of the fuel cell stack as indicated by signals from at least the mass airflow sensor and the differential pressure flow sensor.

14 Claims, 4 Drawing Sheets

(56) References Cited

U.S. PATENT DOCUMENTS

| | | | |
|---|---|---|---|
| 8,178,249 | B2 | 5/2012 | Rutkowski et al. |
| 10,347,928 | B2 | 7/2019 | Pryor |
| 11,296,343 | B2 | 4/2022 | Son et al. |
| 2006/0134480 | A1 | 6/2006 | Beasley et al. |
| 2007/0186619 | A1 | 8/2007 | Butt et al. |
| 2015/0096519 | A1 | 4/2015 | Rodriguez et al. |
| 2017/0338500 | A1 | 11/2017 | Pryor |
| 2021/0226236 | A1 | 7/2021 | Nunokawa |

FOREIGN PATENT DOCUMENTS

| | | | | |
|---|---|---|---|---|
| DE | 102010027882 | A1 | 10/2011 | |
| DE | 102015116952 | A1 * | 4/2017 | ........ H01M 8/04895 |
| JP | 5142176 | B2 * | 2/2013 | .............. H01M 8/04 |
| WO | WO2021003511 | A1 | 1/2021 | |
| WO | WO2022249067 | A1 | 12/2022 | |

OTHER PUBLICATIONS

English language translation of DE-102015116952) Brandau et al., “Method for Operating a Fuel Cell Vehicle and Control Device and Fuel Cell Vehicle”, Apr. 6, 2017.*
English language translation of JP-5142176) “Polymer Electrolyte Fuel Cell System”, Feb. 13, 2013.*
A Breath of Fresh Air: 8-Pin Mass Airflow Sensors, Gears Magazine; Feb. 2018; 8 Pages.
Pressure or Airflow Sensors? Technical Note, Honeywell 2021; 4 pages <sps.honeywell.com/ast>.

* cited by examiner

FUEL CELL VEHICLE WITH DIFFERENTIAL PRESSURE FLOW METER FOR HUMIDITY MEASUREMENT

TECHNICAL FIELD

This application is related to control of a fuel cell vehicle having a differential pressure flow meter to measure humidity at the cathode inlet of a fuel cell stack.

BACKGROUND

Fuel cell vehicles harness a chemical reaction between hydrogen and oxygen to generate electricity, and generally operate more efficiently when the oxygen and hydrogen reactants are pressurized. For the air (oxygen) supply system, this may be accomplished with an air compressor upstream of the fuel cell stack and a throttle valve downstream of the stack operated to control the pressure differential across the stack using sensors to measure the air flow and air pressure within the system. A Fuel Cell Control Unit (FCCU) or other vehicle controller(s) determines the target air flow rate and pressure to provide a requested electric power output, and controls the compressor, throttle valve, and/or other actuators accordingly.

Humidity within the fuel cell stack may affect both performance and longevity of the fuel cells within the stack. Fuel cell systems may include a humidifier to selectively increase the humidity of the ambient air supplied to the fuel cell stack by the air compressor. Various strategies have been developed to measure or infer the humidity including use of an HFR (high frequency resistance) device or a UEGO (universal exhaust gas oxygen) sensor, for example. While suitable for some applications, UEGO sensors were originally developed for relatively warmer engine exhaust gas temperatures and relatively smaller variations in oxygen content such that they may involve more challenging calibration protocols for desired performance in fuel cell applications.

SUMMARY

In various embodiments, a vehicle includes a fuel cell stack having a cathode inlet, a humidifier having an airflow outlet fluidly coupled to the cathode inlet of the fuel cell stack, a mass airflow sensor disposed within an intake airflow upstream of the cathode inlet of the fuel cell stack and upstream of the airflow outlet of the humidifier, and a differential pressure airflow sensor positioned between the airflow outlet of the humidifier and the cathode inlet of the fuel cell stack. The vehicle may also include a controller programmed to operate at least one of the humidifier and the fuel cell stack in response to relative humidity of airflow into the cathode inlet of the fuel cell stack based on a differential pressure signal from the differential pressure airflow sensor. The controller may be further programmed to operate at least one of the humidifier and the fuel cell stack in response to the relative humidity indicated by airflow measured by the mass airflow sensor, airflow measured by the differential pressure airflow sensor, and mass fraction of airflow measured by the differential pressure sensor. The controller may be further programmed to operate at least one of the humidifier and the fuel cell stack in response to mass of water vapor in the intake airflow downstream of the humidifier indicated by differential pressure measured by the differential pressure airflow sensor. The controller may be further programmed to operate at least one of the humidifier and the fuel cell stack in response to a dewpoint temperature of the intake airflow downstream of the humidifier using the mass of water vapor and pressure of the intake airflow at the cathode inlet of the fuel cell stack.

In one or more embodiments, the vehicle may include a temperature sensor and a pressure sensor disposed in the intake airflow between the humidifier and the cathode inlet of the fuel cell stack. The vehicle may also include a humidifier bypass valve disposed upstream of the humidifier, the humidifier bypass valve controlled by the controller in response to the relative humidity of airflow at the cathode inlet of the fuel cell stack as indicated by the mass airflow sensor and the differential pressure airflow sensor. The vehicle may also include an air compressor having an outlet fluidly connected to the cathode inlet of the fuel cell stack upstream of the mass airflow sensor and the humidifier.

Embodiments may include a differential pressure airflow sensor comprising a cone-shaped airflow diverter disposed within a conduit fluidly coupling airflow from the humidifier to the cathode inlet of the fuel cell stack, and further disposed between a first pressure sampling port in the conduit positioned upstream of an apex of the diverter and a second pressure sampling port in the conduit positioned downstream of a base of the diverter. A transducer may be coupled to the first and second pressure sampling ports and provide a signal corresponding to the differential pressure. In various other embodiments, the differential pressure airflow sensor comprises a pitot tube.

Embodiments may also include a differential pressure airflow sensor comprising a conduit fluidly coupling airflow from the humidifier to the cathode inlet of the fuel cell stack and including a frustoconical section having an upstream diameter larger than a downstream diameter, a first pressure sampling port upstream of the frustoconical section, and a second pressure sampling port downstream of the frustoconical section. A transducer may be coupled to the first and second pressure sampling ports and provide a signal corresponding to the differential pressure.

Embodiments may also include a method for controlling a fuel cell vehicle, comprising, by a controller: controlling at least one of a humidifier and a fuel cell stack responsive to relative humidity of airflow at a cathode inlet of the fuel cell stack, the relative humidity indicated by signals from a differential pressure flow sensor positioned downstream of the humidifier and upstream of the cathode inlet of the fuel cell stack. The method may include controlling the humidifier by controlling airflow through the humidifier. Controlling airflow through the humidifier may include operating a bypass valve to direct at least some intake airflow to the cathode inlet of the fuel cell stack bypassing the humidifier. In one or more embodiments, the relative humidity may be indicated using signals from a mass airflow sensor positioned upstream of the humidifier in combination with the signals from the differential pressure flow sensor. The relative humidity may further be based on temperature and pressure of airflow at the cathode inlet of the fuel cell stack.

In one or more embodiments, a fuel cell system includes an air compressor having an inlet fluidly coupled to ambient, a humidifier fluidly coupled to an outlet of the air compressor, a mass airflow sensor disposed downstream of the air compressor and upstream of the humidifier, a fuel cell stack having a cathode inlet fluidly coupled to an outlet of the humidifier, a differential pressure flow sensor disposed downstream of the humidifier and upstream of the cathode inlet of the fuel cell stack, and a controller programmed to control at least one of the air compressor and the fuel cell stack in response to humidity of airflow to the cathode inlet of the fuel cell stack as indicated by signals from at least the mass airflow sensor and the differential pressure flow sensor. The fuel cell system may include a bypass valve positioned downstream of the compressor and upstream of the fuel cell stack, the bypass valve operated by the controller to reduce airflow through the humidifier in response to humidity of the airflow to the cathode inlet exceeding a corresponding threshold. The differential pressure flow sensor may include a conduit fluidly coupling airflow from the humidifier to the cathode inlet of the fuel cell stack and including a frusto-conical section having an upstream diameter larger than a downstream diameter, a first pressure sampling port upstream of the frustoconical section, a second pressure sampling port downstream of the frustoconical section, and a differential pressure transducer coupled to the first and second pressure sampling ports. The controller may be further programmed to adjust speed of the air compressor in response to the humidity of the airflow to the cathode inlet.

Fuel cell systems having a differential pressure flow sensor according to the present disclosure may have one or more advantages. For example, the disclosed differential pressure flow sensors are simple in construction and do not require active control by a vehicle controller (such as needed for use of a UEGO sensor). The differential pressure sensor may be implemented in a short section of molded piping or conduit having a frustoconical section of reducing diameter with pressure sample ports upstream and downstream of the frustoconical section connected to an associated differential pressure transducer with no significant pressure loss over a wide range of operating pressures and humidity. The differential pressure flow sensors require less complex calibration protocols and may use zero differential pressure as a data point indicating zero flow rate.

DETAILED DESCRIPTION

Figure 1:
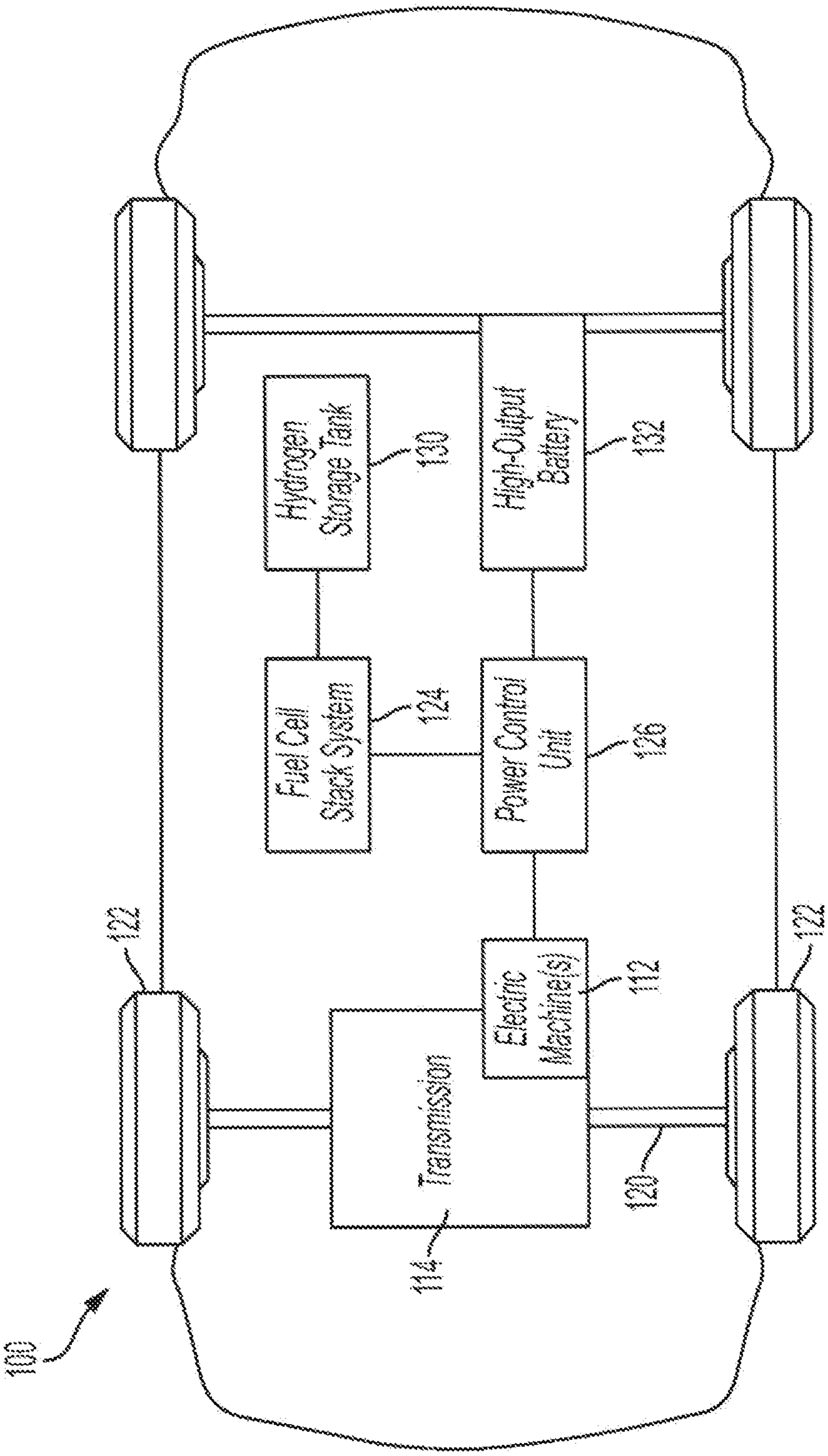
FIG. 1 is a block diagram illustrating a representative fuel cell vehicle having a differential pressure flow meter for determining humidity at the inlet of a fuel cell stack according to the disclosure.

As required, detailed representative examples of the claimed subject matter are disclosed herein; however, it is to be understood that the disclosed examples are merely representative and may be implemented in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Fuel cell stacks typically include hundreds of individual fuel cells. A single conventional fuel cell consists of a membrane electrode assembly (MEA) and two flow-field plates which deliver about 0.5 to 1 V during operation. Individual fuel cells are stacked to form the fuel cell stack, and arranged such that a collective supply manifold for fluid feeds is provided to openings of the cathode, anode, and coolant fields. Similar to batteries, the fuel cell slack achieves higher voltage and power output when compared with an individual cell.

One type of fuel cell stack conventionally used in vehicles is the proton exchange membrane (PEM) fuel cell which includes membrane-electrode interfaces, where the membrane may be a solid polymer membrane electrolyte positioned between an anode and cathode. The anode and cathode are connected to respective current collectors, with openings for gas distribution for the reactants entering and exiting the fuel cell. The cells are operated in a humidified state to maintain performance. Water is produced on the cathode side of the membrane at the catalyst layer. Therefore, water vapor has an easier path to move away from the membrane, through the gas diffusion layer, to the cathode flow field. Thus, the overall hydration level of the membrane is strongly influenced by the cathode flow stream, which has a stronger mechanism for dehydrating the membrane because of higher flow rates on the cathode side. If the PEM is not adequately humidified, the conductivity of the protons in the membrane decreases which can affect cell performance. Furthermore, as the level of membrane hydration decreases, the internal resistance may increase, reducing the output voltage and corresponding power. Additionally, low humidity can cause the PEM to dry out which may result in degradation of the membrane over time. On the other hand, excess humidity also can cause issues in performance by inhibiting the reactants from diffusing to the catalyst sites. This result is caused by Hooding of the electrodes and gas channels if the water removal is insufficient, reducing the PEM's efficiency and power.

As such, control of the cathode inlet hydration level has a strong influence on the overall hydration level of the stack membranes, and the humidity level at the cathode side inlet into a PEM fuel cell stack is important for overall operation of the fuel cell stack. Thus, a humidity sensor is typically provided at the cathode inlet to measure the humidity level. Controlling the water balance for the PEM requires accurate water vapor measurements at temperatures approaching 100° ° C. and pressures up to 3 bar absolute, often at or near saturation levels. Non-industrial humidity sensing technologies typically cannot meet the demands under such harsh environments. The present disclosure uses a differential pressure sensor flow meter in combination with various other sensors commonly used in fuel cell systems, such as a mass airflow sensor, temperature, pressure, etc. to provide an indication of relative humidity of the airflow at the cathode inlet.

Figure 2:
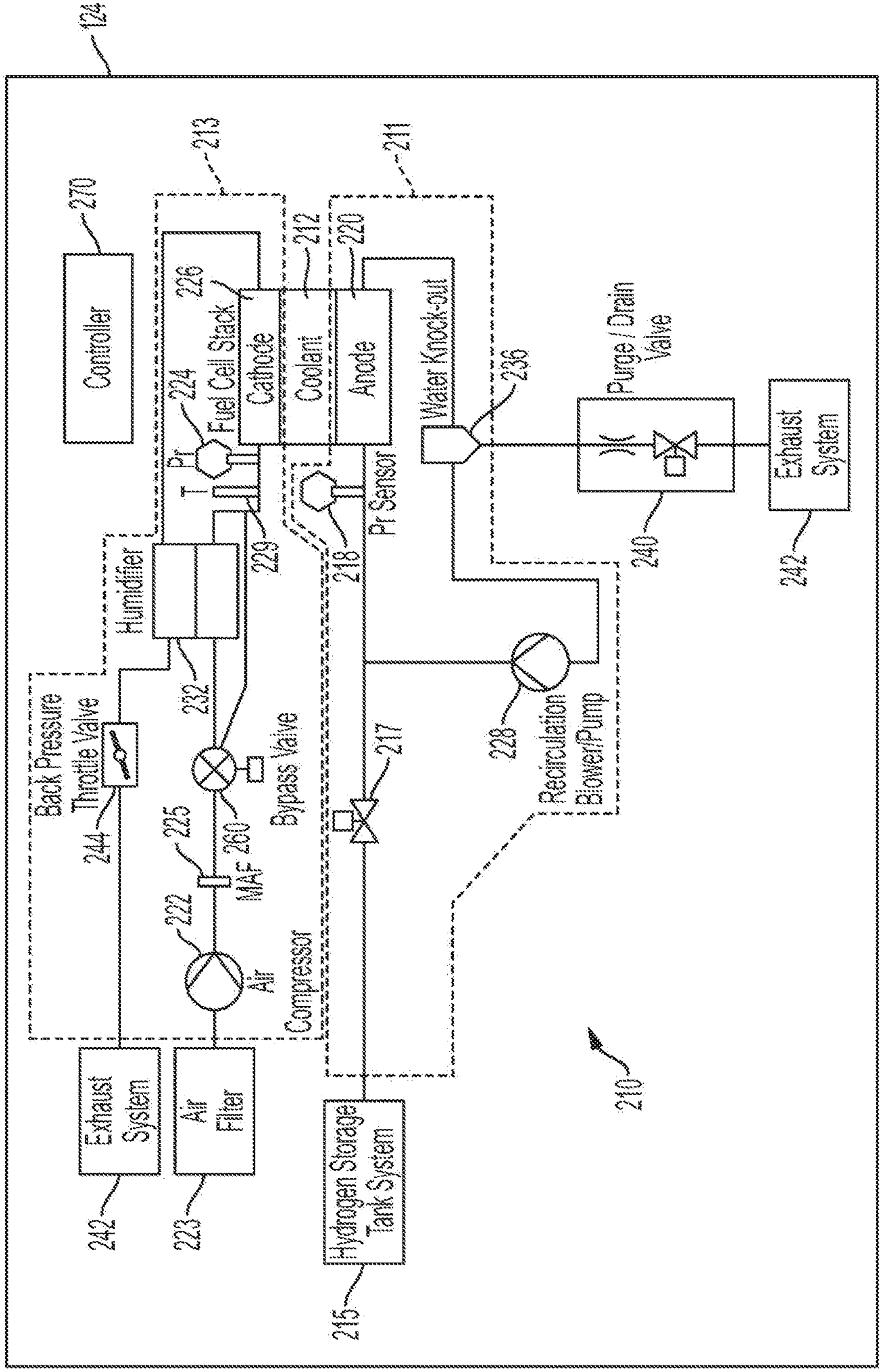
FIG. 2 is a block diagram illustrating various components of a representative vehicle fuel cell system including a differential pressure flow meter for determining humidity of input air for a fuel cell stack.

FIG. 1 is a block diagram illustrating a representative vehicle including a fuel cell system having a differential pressure flow sensor or meter for determining humidity at the inlet of a fuel cell stack. Vehicle 100 may include one or more electric machines 112 mechanically connected to a transmission 114. The electric machines 112 may be capable of operating as a motor or a generator. The transmission 114 may also be mechanically connected to a drive shaft 120 that is mechanically connected to a set of front wheels 122. The electric machines 112 may provide propulsion and regenerative braking capability. A fuel cell stack system 124 may generate electric current to power components of the vehicle 100. For example, a hydrogen delivery system may operate with the fuel cell stack system 124 to convert hydrogen gas and oxygen into electric current to power the electric machines 112. The electric current may be referred to as a load. The fuel cell stack system 124 may include one or more fuel cells making up a fuel cell stack, such as a polymer electrolyte membrane (PEM) fuel cell. The fuel cell stack system 124 may also include a thermal management system and/or an airflow control system. The thermal management system and/or the airflow control system may include, for example, a compressor (as shown in FIG. 2). A power control unit 126 may govern a flow of electricity within the vehicle 100. For example, the power control unit 126 may govern the flow of electricity between the fuel cell stack system 124 and the electric machines 112 and/or a high-output battery 132. A hydrogen storage tank 130 may store hydrogen gas for use by the fuel cell stack system 124. The high-output battery 132 may store energy generated from, for example, a regenerative braking system and may provide supplemental power to the electric machines 112. The various components described above may have one or more associated controllers to control and monitor the operation of the components. The controllers may communicate via a serial bus (e.g., Controller Area Network (CAN)) or via discrete conductors, for example.

FIG. 2 is block diagram illustrating various components of a representative vehicle fuel cell system controlled by a controller 270 based on humidity of airflow entering a cathode inlet of a fuel cell stack as indicated by at least a differential pressure flow sensor according to the disclosure. Fuel cell system 210 includes an anode subsystem 211 configured to provide hydrogen fuel at a desired pressure, flow, and humidity to a fuel cell stack 212. Likewise, a cathode subsystem (loop) 213 is configured to provide oxygen (air) at a desired pressure, flow, and humidity to the fuel cell stack 212. As known in the art, electrical energy may be generated by the fuel cell stack 212 as the hydrogen and oxygen react. This electrical energy may be used to power various electrical devices of the vehicle, to power external electrical loads, to propel the vehicle, and/or be stored within a battery or other energy storage unit as previously described with reference to FIG. 1.

Fuel supply from a hydrogen storage tank system 215 is enabled by controller 270 with the supply pressure to the fuel cell stack 212 controlled by a pressure control device 217 that may be controlled by controller 270. The pressure control device 217 takes input from a pressure sensor 218 at the inlet of the fuel cell stack anode 220 to control the hydrogen fuel pressure to the stack 212. An air compressor 222 controlled by controller 270 increases the ambient pressure of air filtered by air filter 223 based on signals from mass airflow sensor (MAF) 225, pressure sensor 227, temperature sensor 229, and/or differential pressure flow sensor 224 to control the pressure, temperature, and humidity of airflow entering the cathode inlet of the fuel cell stack cathode 226. Outlet airflow from compressor 222 may pass through bypass valve 260 before passing through humidifier 232 to supply cathode 226 with air (oxygen). Bypass valve 260 is controlled by controller 270 to selectively allow at least a portion of the airflow from compressor 222 to bypass humidifier 232 to control humidity of the airflow entering the cathode inlet.

The system is generally controlled such that the pressure on either side of the fuel cell membrane (not shown) between anode 220 and cathode 226 is maintained within a certain tolerance, for example around 600 mbar. The tolerance may vary depending upon the fuel cell stack design. Any overpressure or under pressure may result in system shut down to protect the fuel cell stack membrane.

As previously described, for efficient power generation, the fuel cell stack 212 may require humidified gases. Anode gas humidity may be maintained by recirculating the anode gas mixture from the fuel cell stack outlet using a blower 228 to mix feed gas from the hydrogen storage tank system 215 with the recirculated hydrogen. Cathode gas (air) humidity is maintained by controlling humidifier 232, such as by controlling airflow through humidifier 232 using bypass valve 260 and/or controlling water flow to humidifier 232, for example.

At the anode side of the fuel cell stack outlet, a water knock-out 236 and purge/drain valve 240 are provided to remove water from the anode outlet. This removed water is passed to exhaust system 242 of the vehicle 214. At the cathode side of the fuel cell stack outlet, a back pressure throttle valve 244 fluidly connects the humidifier 232 and the exhaust system 242. Position of throttle valve 244 and compressor 222 are controlled by controller 270 to maintain a desired cathode subsystem pressure. A throttle valve position signal may be used by controller 270 to determine when the throttle valve 244 is with a predetermined range of a wide-open throttle (WOT) position and/or at WOT position.

Figure 3:
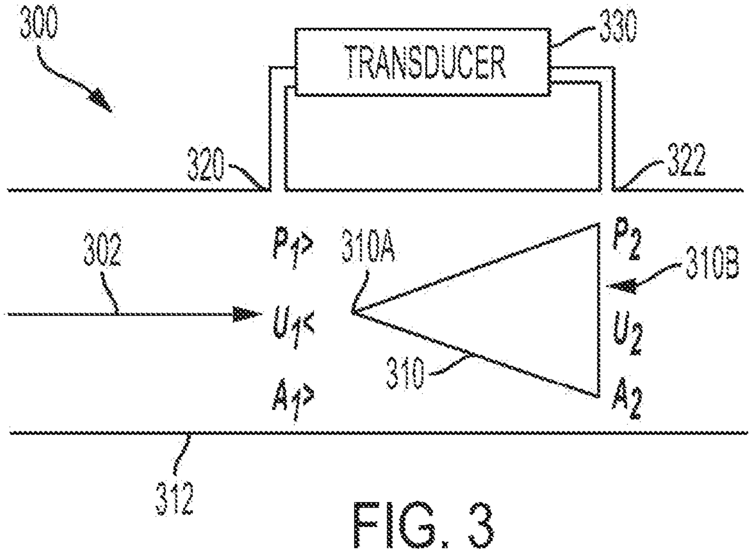
FIG. 3 illustrates a first representative construction for a differential pressure flow meter suitable for use in determining humidity of air input to a fuel cell stack.
Figure 4:
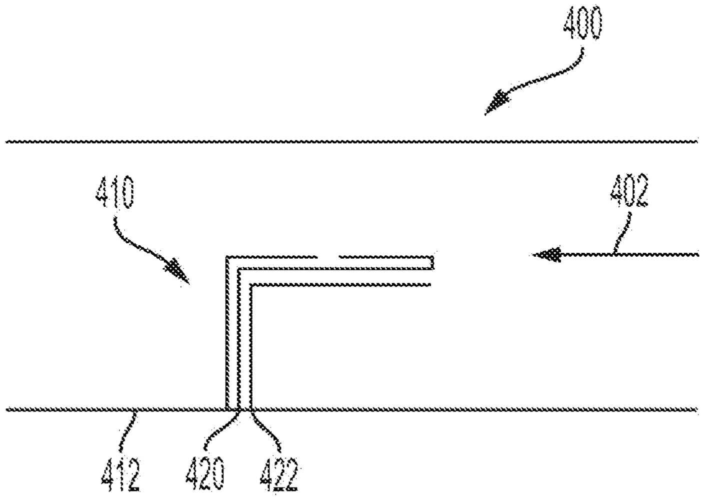
FIG. 4 illustrates a second representative construction for a differential pressure flow meter suitable for use in determining humidity of air input to a fuel cell stack.
Figure 5:
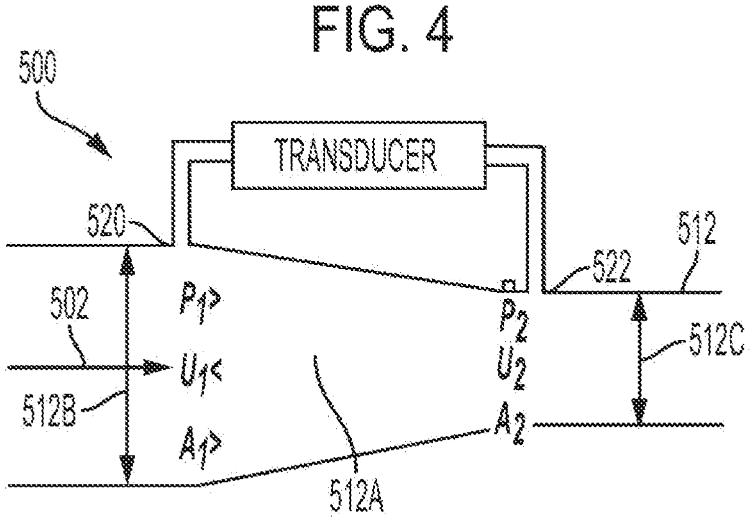
FIG. 5 illustrates a third representative construction for a differential pressure flow meter suitable for use in determining humidity of air input to a fuel cell stack.

FIGS. 3-5 illustrate representative constructions for a differential pressure flow sensor for use in determining humidity of airflow entering a cathode inlet of a fuel cell stack according to the disclosure. As described in greater detail below, the representative constructions provide a differential pressure flow sensor that generates measurements that are directly proportional to ½ the density of the airflow multiplied by the square of the airflow velocity. With known dry air mass measured by an upstream mass airflow sensor, any additional mass is attributable to water vapor introduced by the humidifier and the relative humidity or dew point temperature and pressure of the airflow entering the cathode inlet of the fuel cell stack may be determined and used to control one or more components of the system to adjust the humidity to be within a desired range. Variables and subscripts used in the mathematical descriptions to demonstrate representative indication of humidity using signals or measurements from an associated mass airflow sensor, differential pressure sensor, and one or more pressure or temperature sensors correspond to:

P: pressure
ρ: density
f: fraction
u: velocity
A: area (for flowrate)
a: air
v: vapor(water)
i: in or upstream of humidifier
o: out or downstream of humidifier $$\overset{*}{m}_{ai} = f_{ai}\rho_a(T_i, P_{\sum i})u_i A_i$$

$$\overset{*}{m}_{ao} = f_{ao}\rho_a(T_o, P_{\sum o})u_o A_o$$

$$\overset{*}{m}_{ai} = \overset{*}{m}_{ao}$$

F: calibration factor for the flow sensor

FIG. 3 illustrates a first representative construction for a differential pressure flow sensor or meter suitable for use in determining humidity of airflow provided to a cathode input of a fuel cell stack. Differential pressure flow sensor 300 includes a cone-shaped airflow diverter 310 disposed within a conduit 312 fluidly coupling airflow from the humidifier to the cathode inlet of the fuel cell stack with airflow direction indicated at 302. The cone-shaped airflow diverter 310 is further disposed between a first pressure sampling port 320 in the conduit 312 positioned upstream of an apex 310A of the diverter 310 and a second pressure sampling port 322 in the conduit 312 positioned downstream of a base 310B of the diverter 310. A differential pressure transducer 330 is coupled to the first pressure sampling port 320 and the second sampling port 322 and provides a signal corresponding to the differential pressure (ΔP). For this construction, the differential pressure may be mathematically represented by:

$$p + \frac{\rho u^2}{2} + \rho g h = const$$

$$p_1 + \frac{\rho u_1^2}{2} = p_2 + \frac{\rho u_2^2}{2}$$

$$(\rho) u_1 A_1 = (\rho) u_2 A_2$$

$$\Delta p = p_1 - p_2 = \frac{\rho}{2}(u_2^2 - u_1^2) = \frac{\rho}{2} u_1^2 \left\{ \left( \frac{A_1}{A_2} \right)^2 - 1 \right\}$$

$$\Delta p = \frac{\rho}{2} u_1^2 (AR^2 - 1) = \text{factor}_c \frac{\rho}{2} u_1^2$$

$$\boxed{\Delta p \propto \frac{\rho}{2} u^2}$$

where $P_1$ represents pressure, $u_1$ represents airflow velocity, and $A_1$ represents area of the opening surrounding the diverter 310 within the conduit 312 at the first pressure sampling port, and $P_2$ represents pressure, $u_2$ represents airflow velocity, and $A_2$ represents area of the opening surrounding the diverter 310 within the conduit at the second pressure sampling port.

FIG. 4 illustrates a second representative construction for a differential pressure flow meter or sensor suitable for use in determining humidity of airflow provided to a cathode input of a fuel cell stack. Differential pressure flow sensor 400 is implemented by a pitot tube 410 disposed with a conduit 412 with airflow direction indicated at 402. Pitot tube 410 provides a static pressure ($P_s$) via a first pressure sampling port 420 and a stagnation pressure ($P_t$) via a second pressure sampling port 422 in conduit 412 to a corresponding transducer (not shown) that provides a signal corresponding to the differential pressure (ΔP). For this construction, the differential pressure may be mathematically represented by:

$$p + \frac{\rho u^2}{2} + \rho g h = const$$

$$p_s + \frac{\rho u^2}{2} = p_t$$

$$\Delta p = p_1 - p_2 = \frac{\rho}{2} u^2$$

$$\boxed{\Delta p \propto \frac{\rho}{2} u^2}$$

FIG. 5 illustrates a third representative construction for a differential pressure flow meter or sensor suitable for use in determining humidity of airflow provided to the cathode input of a fuel cell stack. Differential pressure flow sensor 500 includes a conduit 512 fluidly coupling airflow from the humidifier to the cathode inlet of the fuel cell stack. Conduit 512 includes a truncated cone or frustoconical section 512A having an upstream diameter 512B larger than a downstream diameter 512C relative to airflow direction 502. A first pressure sampling port 520 is positioned upstream of the frustoconical section 512A, and a second pressure sampling port 522 is positioned downstream of the frustoconical section 512A. The first pressure sampling port 520 and the second pressure sampling port 522 are fluidly coupled to a corresponding transducer (not shown) that provides a signal corresponding to the differential pressure (ΔP). For this construction, the differential pressure may be mathematically represented by:

$$p + \frac{\rho u^2}{2} + \rho g h = const$$

$$p_1 + \frac{\rho u_1^2}{2} = p_2 + \frac{\rho u_2^2}{2} + f \frac{L}{D} \frac{\rho u_1^2}{2}$$

$$\Delta p = p_1 - p_2 = \frac{\rho}{2}\left(u_2^2 - u_1^2 + f \frac{L}{D} u_1^2\right) = \frac{\rho}{2} u_1^2 \left\{ \left( \frac{A_1}{A_2} \right)^2 - 1 + f \frac{L}{D} \right\} = \frac{\rho}{2} u_1^2 F$$

$$\boxed{\Delta p \propto \frac{\rho}{2} u^2}$$

where $P_1$ represents pressure, $u_1$ represents airflow velocity, and $A_1$ represents area within the conduit 512 at the first pressure sampling port 520, and $P_2$ represents pressure, $u_2$ represents airflow velocity, and $A_2$ represents area within the conduit 512 at the second pressure sampling port 522.

The density for a mixed gas (such as humidified air containing air and water vapor) can be calculated using the individual fraction or partial pressure in addition to the temperature and sum of partial pressures. Representative equations based on the universal gas law are generally known by those of skill in the art and are provided below for convenience without detailed explanation:

$$\rho = \rho_a(T, P_a) + p_v(T, P_v)$$

$$P_a + P_v = P_\Sigma$$

$$\rho = f_a \rho_a(T, P_\Sigma) + f_v \rho_v(T, P_\Sigma)$$

$$f_a + f_v = 1,$$

$$f_a = \frac{P_a}{P_\Sigma},$$

$$f_v = \frac{P_v}{P_\Sigma}$$

$$\rho = \frac{m}{V} = \frac{PM}{\overline{R}T}$$

$$\rho = \frac{m}{V} = \frac{m_a + m_v}{V} = \frac{m_a}{V} + \frac{m_v}{V}$$

$$P_\Sigma V = \frac{m_\Sigma}{M} \overline{R} T$$

$$P_a V = \frac{m_a}{M_a} \overline{R} T$$

$$P_v V = \frac{m_v}{M_v} \overline{R} T$$

-continued $$\rho = \frac{m}{V} = \frac{PM}{\overline{R}T}$$

$$\rho_a = \frac{m_a}{V} = \frac{P_a M_a}{\overline{R}T} = \frac{f_a P_\Sigma M_a}{\overline{R}T}$$

$$\rho_v = \frac{m_v}{V} = \frac{P_v M_v}{\overline{R}T} = \frac{f_v P_\Sigma M_v}{\overline{R}T}$$

Using the above, the differential pressure between the sampling ports of the differential pressure flow sensor may be determined based on the following:

$$\Delta P_o = F\frac{1}{2}\rho_o(T_o, P_{\Sigma o})u_o^2 \quad \text{Eqn(1)}$$

$$= F\frac{1}{2}\{f_{ao}\rho_a(T_o, P_{\Sigma o}) + f_{vo}\rho_v(T_o, P_{\Sigma o})\}u_o^2$$

$$= F\frac{1}{2}\left\{f_{ao}\rho_a(T_o, P_{\Sigma o}) + f_{vo}\rho_a(T_o, P_{\Sigma o})\frac{18.02}{28.97}\right\}u_o^2$$

$$= F\frac{1}{2}\rho_a(T_o, P_{\Sigma o})\left(f_{ao} + f_{vo}\frac{18.02}{28.97}\right)u_o^2$$

$$= F\frac{1}{2}\rho_a(T_o, P_{\Sigma o})\left(f_{ao} + f_{vo} - \frac{10.95}{28.97}f_{vo}\right)u_o^2$$

$$= F\frac{1}{2}\rho_a(T_o, P_{\Sigma o})\left(1 - \frac{10.95}{28.97}f_{vo}\right)u_o^2$$

$$= F\frac{1}{2}\rho_a(T_o, P_{\Sigma o})(1 - 0.378 f_{vo})u_o^2$$

$$= F\frac{1}{2}\beta(1 - \alpha f_{vo})u_o^2,$$

$$\alpha = 0.378,$$

$$\beta = \rho_a(T_o, P_{\Sigma o})$$

$$F\frac{1}{2}\beta(1 - \alpha f_{vo})u_o^2 - \Delta P_o = 0$$

Using Equation (1) assuming values for the partial fraction of the water vapor of dry air in the first case, and no air in the second case provides:

$$\text{if } f_{vo} = 0 \text{ (dry)},$$

$$\Delta P = F\frac{1}{2}\rho_a(T_o, P_{\Sigma o})u_o^2$$

$$\text{if } f_{vo} = 1 \text{ (no air)},$$

$$\Delta P = F\frac{1}{2}\rho_a(T_o, P_{\Sigma o})(1 - \alpha)u_o^2$$

$$= F\frac{1}{2}\rho_a(T_o, P_{\Sigma o})0.622u_o^2$$

$$= F\frac{1}{2}\rho_a(T_o, P_{\Sigma o})\frac{18.02}{28.97}u_o^2$$

$$= F\frac{1}{2}\rho_v(T_o, P_{\Sigma o})u_o^2$$

The mass flow rate from the differential pressure sensor may then be used to determine the dew point temperature (and associated relative humidity) based on the following:

$$\overset{*}{m}_{ao} = f_{ao}\rho_a(T_o, P_{\Sigma o})u_o A_o = (1 - f_{vo})\rho_a(T_o, P_{\Sigma o})u_o A_o \quad \text{Eqn(2)}$$

$$1 - f_{vo} = \frac{\overset{*}{m}_{ao}}{\rho_a(T_o, P_{\Sigma o})u_o A_o}$$

-continued $$f_{vo} = 1 - \frac{\overset{*}{m}_{ao}}{\rho_a(T_o, P_{\Sigma o})u_o A_o},$$

$$f_{vo} = 1 - \frac{\overset{*}{m}_{ao}}{\beta u_o A_o}$$

from Eqn(2):

$$\text{if } f_{vo} = 0 \text{ (dry)},$$

$$\overset{*}{m}_{ao} = \rho_a(T_o, P_{\Sigma o})u_o A_o$$

$$\text{if } f_{vo} = 1 \text{ (no air)},$$

$$\overset{*}{m}_{ao} = 0$$

substituting back into Eqn(1) provides:

$$F\frac{1}{2}\beta\left\{1 - \alpha\left(1 - \frac{\overset{*}{m}_{ao}}{\beta u_o A_o}\right)\right\}u_o^2 - \Delta P_o = 0 \quad \text{Eqn(3)}$$

$$(1 - \alpha)u_o^2 + \frac{\alpha \overset{*}{m}_{ao}}{\beta A_o}u_o - \frac{2\Delta P_o}{F\beta} = 0,$$

$$\text{quadratic in } u_o$$

Solve for $u_o$, then $f_{vo}$ from Eqn(2)

$$P_{dew} = P_{vo} = f_{vo}P_{\Sigma o},$$

$$\text{then obtain } T_{dew}$$

Figure 6:
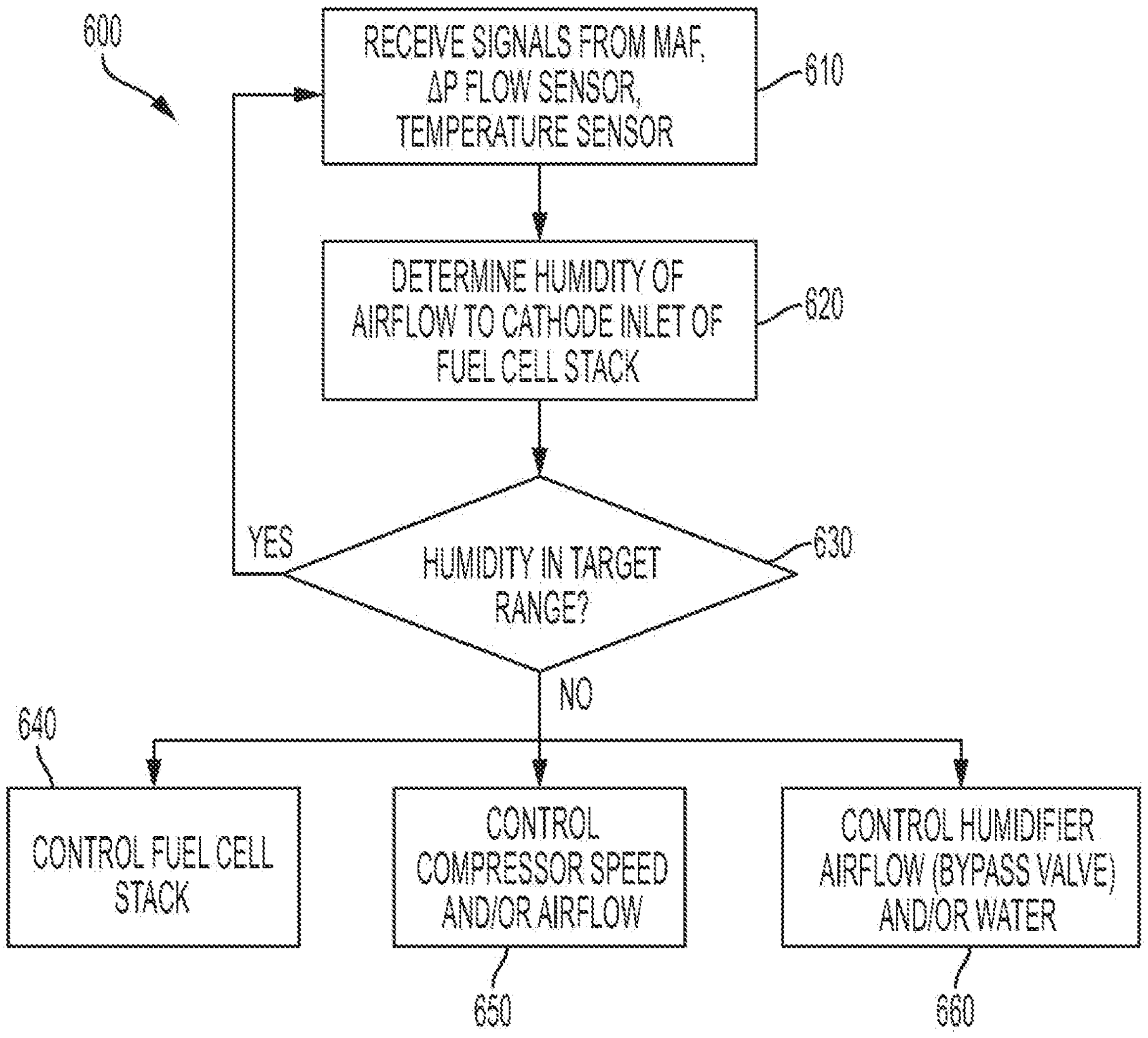
FIG. 6 illustrates operation of a system or method for determining humidity of air input to a fuel cell stack using a differential pressure flow meter.

FIG. 6 illustrates operation of a system or method for determining humidity of airflow provided to the cathode input of a fuel cell stack using a differential pressure flow meter. The controller 270 (FIG. 2) may be implemented as a dedicated FCCU or may cooperate with one or more other controllers, such as a vehicle or powertrain controller to perform one or more control functions described herein. Control logic, functions, code, software, strategy etc. performed by one or more processors or controllers such as controller 270 and/or an FCCU may be represented by the block diagrams or flow charts shown in the various figures. The flow chart or block diagram 600 of FIG. 6 illustrates a representative control strategy, algorithm, and/or logic for operation of a fuel cell system or method using a differential pressure flow meter or sensor for detecting humidity of airflow provided to the cathode inlet of a fuel cell stack that may be implemented using one or more processing strategies such as event-driven, interrupt-driven, multi-tasking, multi-threading, and the like. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, powertrain, and/or FCCU. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or controller to control the vehicle or its subsystems.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software, and firmware components.

As illustrated in FIG. 6, system or method 600 includes receiving signals from various system sensors by one or more associated controllers as represented at 610. Signals may be received from a mass airflow sensor (MAF), ΔP (differential pressure) flow sensor, temperature sensor, etc. as previously described. One or more controllers then determines humidity of the airflow being provided to the cathode inlet of the fuel cell stack based at least on the signal from the differential pressure flow sensor in combination with signals from one or more other sensors as represented at 620. Block 630 determines whether the humidity is within a target range, which may include comparing the determined humidity to one or more associated thresholds. If the humidity is not within the target range, the controller may control one or more system actuators to adjust the humidity of the airflow provided to the cathode inlet as generally represented at 640, 650, and 660. For example, the controller may control operation of the fuel cell stack as represented at 640, control the compressor speed and/or airflow as represented at 650, and/or control the humidifier as represented at 660. The humidifier may be controlled by operating a bypass valve to direct at least some airflow to bypass the humidifier. Alternatively, or in combination, the humidifier may be controlled by controlling water flow to the humidifier, or distribution of water within the humidifier, for example.

While representative examples are described above, it is not intended that these examples describe all possible forms or implementations of the claimed subject matter. The words used in the specification are words of description rather than limitation, and it is understood that various changes may be made without departing from scope of the claims. Additionally, the features of various implementing examples may be combined with one or more features from other examples to form further examples or embodiments of the claimed subject matter whether or not the particular combination of features is explicitly illustrated or described in detail. Although one or more examples or features may have been described as providing advantages over other examples or prior art implementations with respect to one or more desired characteristics, those of ordinary skill in the art recognize that one or more features or characteristics can be compromised to achieve desired overall system attributes, which depend on the specific application and implementation. As such, examples described as less desirable than others or prior art implementations with respect to one or more characteristics are not outside the scope of the disclosure and may be desirable for particular applications.

What is claimed is:

1. A vehicle comprising:

a fuel cell stack having a cathode inlet;

a humidifier having an airflow outlet fluidly coupled to the cathode inlet of the fuel cell stack;

a mass airflow sensor disposed within an intake airflow upstream of the cathode inlet of the fuel cell stack and upstream of the airflow outlet of the humidifier;

a differential pressure airflow sensor positioned between the airflow outlet of the humidifier and the cathode inlet of the fuel cell stack; and a controller programmed to operate at least one of the humidifier and the fuel cell stack in response to relative humidity of intake airflow into the cathode inlet of the fuel cell stack, wherein the controller is further programmed to detect the relative humidity of the intake airflow based on (i) a mass flow rate of the intake airflow measured by the mass airflow sensor and (ii) a density of the intake airflow based on a differential pressure signal from the differential pressure airflow sensor.

2. The vehicle of claim 1 wherein the controller is further programmed to detect the relative humidity of the intake airflow further based on a mass fraction of water vapor in the intake airflow based on the mass flow rate of the intake airflow and the density of the intake airflow.

3. The vehicle of claim 2 wherein the controller is further programmed to operate at least one of the humidifier and the fuel cell stack in response to mass of water vapor in the intake airflow downstream of the humidifier indicated by differential pressure measured by the differential pressure airflow sensor.

4. The vehicle of claim 3 wherein the controller is further programmed to operate at least one of the humidifier and the fuel cell stack in response to a dewpoint temperature of the intake airflow downstream of the humidifier using the mass of water vapor and pressure of the intake airflow at the cathode inlet of the fuel cell stack.

5. The vehicle of claim 4 further comprising a temperature sensor and a pressure sensor disposed in the intake airflow between the humidifier and the cathode inlet of the fuel cell stack.

6. The vehicle of claim 1 further comprising a humidifier bypass valve disposed upstream of the humidifier, the humidifier bypass valve controlled by the controller in response to the relative humidity of the intake airflow.

7. The vehicle of claim 1 further comprising an air compressor having an outlet fluidly connected to the cathode inlet of the fuel cell stack upstream of the mass airflow sensor and the humidifier.

8. The vehicle of claim 1 wherein the differential pressure airflow sensor comprises a cone-shaped airflow diverter disposed within a conduit fluidly coupling airflow from the humidifier to the cathode inlet of the fuel cell stack, and further disposed between a first pressure sampling port in the conduit positioned upstream of an apex of the diverter and a second pressure sampling port in the conduit positioned downstream of a base of the diverter.

9. The vehicle of claim 1 wherein the differential pressure airflow sensor comprises a pitot tube.

10. The vehicle of claim 1 wherein the differential pressure airflow sensor comprises a conduit fluidly coupling airflow from the humidifier to the cathode inlet of the fuel cell stack and including a frustoconical section having an upstream diameter larger than a downstream diameter, a first pressure sampling port upstream of the frustoconical section, a second pressure sampling port downstream of the frustoconical section, and a differential pressure transducer coupled between the first and second pressure sampling points and configured to provide the differential pressure signal.

11. A fuel cell system comprising:
- an air compressor having an inlet fluidly coupled to ambient;
- a humidifier fluidly coupled to an outlet of the air compressor;
- a mass airflow sensor disposed downstream of the air compressor and upstream of the humidifier;
- a fuel cell stack having a cathode inlet fluidly coupled to an outlet of the humidifier;
- a differential pressure flow sensor disposed downstream of the humidifier and upstream of the cathode inlet of the fuel cell stack; and
- a controller programmed to control at least one of the air compressor and the fuel cell stack in response to humidity of airflow to the cathode inlet of the fuel cell stack as indicated by from at least (i) a mass flow rate of the airflow to the cathode inlet measured by the mass airflow sensor and (ii) a density of the airflow to the cathode inlet based on a differential pressure signal from the differential pressure flow sensor.

12. The fuel cell system of claim 11 further comprising a bypass valve positioned downstream of the compressor and upstream of the fuel cell stack, the bypass valve operated by the controller to reduce airflow through the humidifier in response to humidity of the airflow to the cathode inlet exceeding a corresponding threshold.

13. The fuel cell system of claim 12 wherein the differential pressure flow sensor comprises a conduit fluidly coupling airflow from the humidifier to the cathode inlet of the fuel cell stack and including a frustoconical section having an upstream diameter larger than a downstream diameter, a first pressure sampling port upstream of the frustoconical section, and a second pressure sampling port downstream of the frustoconical section.

14. The fuel cell system of claim 13 wherein the controller adjusts speed of the air compressor in response to the humidity of the airflow to the cathode inlet.

* * * * *